United States Patent
Choi et al.

(10) Patent No.: US 7,982,713 B2
(45) Date of Patent: Jul. 19, 2011

(54) MULTI-POINTING METHOD USING MAGNETIC FIELD AND DEVICE THEREFOR

(75) Inventors: Hyok-sung Choi, Yongin-si (KR); Su-hyun Kim, Seoul (KR); Seong-kook Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 11/773,566

(22) Filed: Jul. 5, 2007

(65) Prior Publication Data

US 2008/0192000 A1    Aug. 14, 2008

(30) Foreign Application Priority Data

Feb. 8, 2007    (KR) .................. 10-2007-0013323

(51) Int. Cl.
    *G06F 3/033*    (2006.01)
(52) U.S. Cl. ...................................... 345/158
(58) Field of Classification Search .......... 345/104, 345/111, 87, 86, 84, 55, 30, 173, 177, 179
    See application file for complete search history.

(56) References Cited

U.S. PATENT DOCUMENTS

| | | | |
|---|---|---|---|
| 5,854,881 A | 12/1998 | Yoshida et al. | |
| 6,369,806 B1 * | 4/2002 | Endo et al. ................ | 345/174 |
| 6,801,192 B2 * | 10/2004 | Fujitsuka et al. ............ | 345/179 |
| 2004/0239652 A1 * | 12/2004 | Taylor et al. ................ | 345/179 |
| 2005/0083316 A1 * | 4/2005 | Brian et al. ................. | 345/179 |
| 2005/0162411 A1 * | 7/2005 | Berkel van ................. | 345/179 |
| 2008/0158165 A1 * | 7/2008 | Geaghan et al. ............. | 345/173 |

FOREIGN PATENT DOCUMENTS

| | | |
|---|---|---|
| JP | 08-212002 A | 8/1996 |
| KR | 1999-0023288 U | 7/1999 |

* cited by examiner

*Primary Examiner* — Richard Hjerpe
*Assistant Examiner* — Jeffrey Parker
(74) *Attorney, Agent, or Firm* — Sughrue Mion, PLLC

(57) ABSTRACT

A multi-pointing method using a magnetic field is provided. When one or more pointing devices that generate magnetic fields move or rotate, locations and directions of rotation of the one or more pointing devices are sensed based on patterns of magnetic fields generated by the one or more pointing devices and changes in the patterns.

24 Claims, 6 Drawing Sheets

MULTI-POINTING METHOD USING MAGNETIC FIELD AND DEVICE THEREFOR

CROSS-REFERENCE TO RELATED PATENT APPLICATION

This application claims the benefit of Korean Patent Application No. 10-2007-0013323, filed on Feb. 8, 2007, in the Korean Intellectual Property Office, the disclosure of which is incorporated herein in its entirety by reference.

BACKGROUND OF THE INVENTION

1. Field of the Invention

Methods and devices consistent with the present invention relate to a pointing system and, more particularly, to a multi-pointing method using a magnetic field and a system therefore.

2. Description of the Related Art

Existing pointing systems include a system using light, a system using a touch screen, a system using an ultrasonic wave, a system using a radio frequency (RF) signal, and the like.

In the system using light, when a user designates a predetermined location on a display device by using a light gun, the location is sensed by using a display timing of a CRT scanning line. The system using light is supported by only CRT display devices.

In the system using the touch screen, when a surface of a display device is pointed by using a finger or stylus pen, the pointed location is sensed through a pressure sensing device. In general, the system using the touch screen cannot receive a plurality of pointing locations at the same time. When there is another object on the surface, the system using the touch screen is influenced by a pressure of the object.

In the system using the ultrasonic wave, an ultrasonic wave is generated in the periphery of a display device, and a pointing device gathers the ultrasonic wave and calculates a distance. Alternatively, the pointing device generates the ultrasonic wave, gathers the ultrasonic wave in the periphery of the display device, and recognizes the distance. In general, the system using the ultrasonic wave cannot receive a plurality of pointing locations at the same time. When there is another object on the surface or in the periphery of the pointer, the system using the ultrasonic wave is influenced by the object.

In the system using the RF signal, a location of a pointing device which generates an RF signal is recognized from a plurality of RF receiving units using resonance. The system using the RF signal can receive a plurality of pointing locations at the same time. However, because a plurality of RF receiving units are needed, costs are relatively high.

As discussed above, some of the existing pointing systems cannot provide a multi-pointing operation. On the other hand, in the existing pointing systems which can provide the multi-pointing operation, the costs are high.

SUMMARY OF THE INVENTION

The present invention provides a multi-pointing method using a magnetic field which provides a multi-pointing operation without interference with other objects having no magnetic field and a system therefor.

According to an aspect of the present invention, there is provided a multi-pointing system using a magnetic field including: a pointing device which includes at least one of a permanent magnet or electromagnet to generate a magnetic field; and a pointing sensing unit which senses a location and a direction of rotation of the pointing device based on a pattern of the magnetic field generated by the pointing device and a change in the pattern.

When there are a plurality of pointing devices, locations and directions of rotation of the plurality of pointing devices may be separately sensed based on patterns of magnetic fields generated by the plurality of the pointing devices or period of a change in the patterns.

The pointing sensing unit may include: a horizontal sensing unit which senses a magnetic field generated by the pointing device in the x-axis direction; a vertical sensing unit which senses the magnetic field generated by the pointing device in the y-axis direction; and an integrated sensing unit which senses the location and the direction of rotation of the pointing device by using the magnetic field sensed by the horizontal and vertical sensing units.

The horizontal and vertical sensing units may be constructed with a coil in which a current is induced when the pointing device approaches the coil within a predetermined distance, and wherein the integrated sensing unit senses the location and the direction of rotation of the pointing device by using a pattern of a magnitude of the current induced in the coil and a change in the pattern depending on locations.

The integrated sensing unit may sense a location in which the magnitude of the current is the largest as the location of the pointing device.

The pointing sensing unit may include: a cell unit which includes a plurality of unit cells and which senses a magnetic field generated by the pointing device; and an integrated sensing unit which senses the location and the direction of rotation of the pointing device by using the magnetic field sensed by the cell unit.

The unit cells may be constructed with a coil in which a current is induced when the pointing device approaches the coil within a predetermined distance, and wherein the integrated sensing unit senses a location of a unit cell in which the largest current is induced among the plurality of unit cells as the location of the pointing device.

The unit cell may be constructed with a button which is pressed by a repulsive force with respect to the magnetic field generated by the pointing device, and the integrated sensing unit senses a location of the pressed button as the location of the pointing device.

The unit cell may be constructed with a pressure sensor which senses pressing strength due to the repulsive force with respect to the magnetic field generated by the pointing device in each region of the unit cell, and wherein the integrated sensing unit senses a location of a region in which the pressing strength is the largest among the regions of the unit cell as the location of the pointing device.

The pointing device may be a pen or puck shape.

According to another aspect of the present invention, there is provided a multi-pointing method including: allowing at least one pointing device which generates a magnetic field to move or rotate; and sensing a location and a direction of rotation of the pointing device based on a pattern of the magnetic field generated by the pointing device and a change in the pattern.

According to another aspect of the present invention, there is provided a computer-readable recording medium having embodied thereon a computer program for executing the multi-pointing method including: allowing at least one pointing device which generates a magnetic field to move or rotate; and sensing a location and a direction of rotation of the pointing device based on a pattern of the magnetic field generated by the pointing device and a change in the pattern.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Now, exemplary embodiments of the present invention will be described in detail with reference to the attached drawings.

Figure 1:
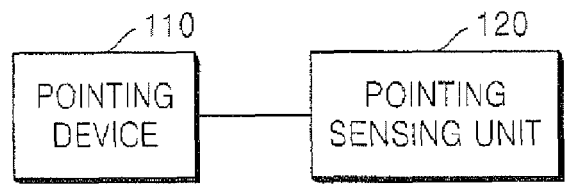
FIG. 1 illustrates a multi-pointing system using a magnetic field according to an exemplary embodiment of the present invention.

FIG. 1 illustrates a multi-pointing system using a magnetic field according to an exemplary embodiment of the present invention.

Referring to FIG. 1, the multi-pointing system using a magnetic field according to the exemplary embodiment includes a pointing device 110 and a pointing sensing unit 120.

The pointing device 110 includes at least one of a permanent magnet and an electromagnet to generate a magnetic field.

Here, the permanent magnet continuously generates the magnetic field, whereas the electromagnet controls generation of the magnetic field. For example, in case of the electromagnet, it is possible to control the generation of the magnetic field in a manner in which the magnetic field is periodically generated and the generation of the magnetic field is stopped.

The pointing device 110 may be constructed with a permanent magnet or electromagnet. Alternatively, the pointing device 110 may be constructed by combining a permanent magnet with an electromagnet.

Figure 2:
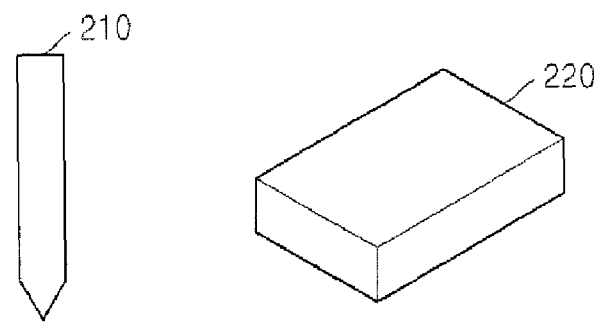
FIG. 2 illustrates a pointing device according to an exemplary embodiment of the present invention.

FIG. 2 illustrates a pointing device according to an exemplary embodiment of the present invention.

Referring to FIG. 2, the pointing device according to the exemplary embodiment may have a pen shape 210 or puck shape 220. In case of the pointing device with the puck shape 220, it is possible to perform a rotation operation. However, in case of the pointing device with the pen shape 210, when a tip of the pen has a narrow width, it is difficult to perform a rotation operation. Accordingly, when the pointing device has the puck shape 220, or when the pointing device has the pen shape 210 with a wide width, it is possible to set the pointing device so that different commands are performed depending on whether the direction of rotation is a clockwise or counter-clockwise direction. For example, when the puck 220 is rotated in a clockwise direction, it is possible to set the pointing device so that an execution command is input. When the puck 220 is rotated in a counter-clockwise direction, it is possible to set the pointing device so that a cancel command is input.

The pointing sensing unit 220 senses a location and a direction of rotation of the pointing device on the basis of a pattern of a magnetic field generated by the pointing device 210 and a change in the pattern.

Here, the pattern of the magnetic field is a shape of the magnitude of the magnetic field generated by the pointing device 210. The pattern of the magnitude of the magnetic field can be sensed through the magnitude of the current induced by the electromagnetic induction phenomenon.

Figure 3:
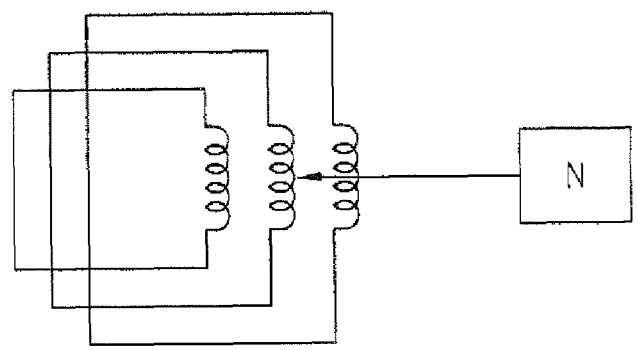
FIG. 3 illustrates an electromagnetic induction phenomenon.

FIG. 3 illustrates an electromagnetic induction phenomenon.

Referring to FIG. 3, the pointing device is indicated by N. When the pointing device N approaches a coil in a magnetic field or moves within a predetermined distance, a current temporarily flows in the coil. A phenomenon that a current temporarily flows due to movement of the pointing device is referred to as an electromagnetic induction phenomenon.

Figure 4:
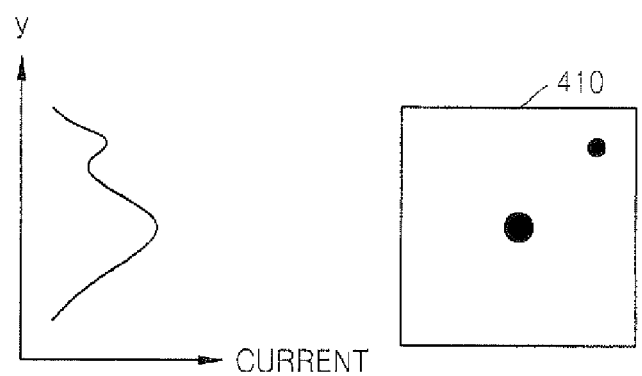
FIG. 4 illustrates a pattern of a magnetic field according to an exemplary embodiment of the present invention.
Figure 4:
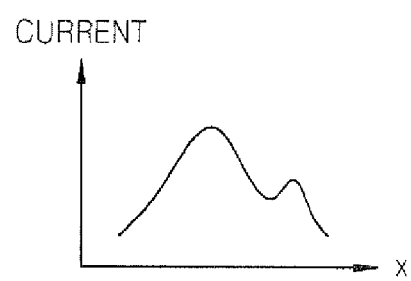
Figure 4:
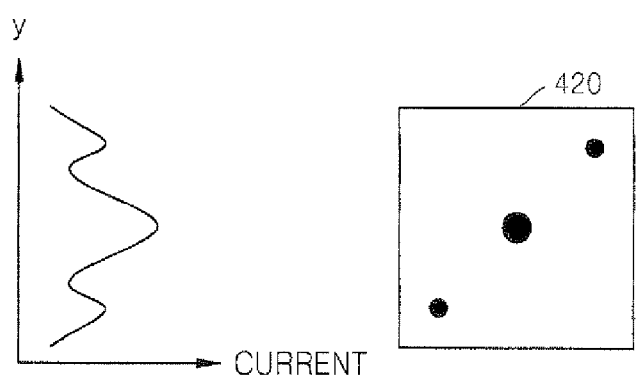
Figure 4:
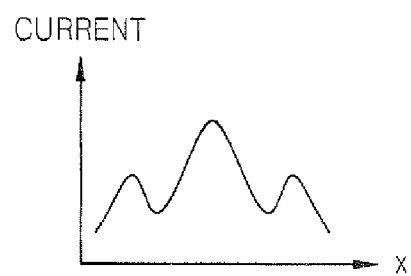

FIG. 4 illustrates a pattern of a magnetic field according to an exemplary embodiment of the present invention.

Referring to FIG. 4, a first pointing device 410 constructed with two permanent magnets and a second pointing device 420 constructed with three permanent magnets are shown.

The patterns of the magnitudes of the currents induced by the magnetic fields generated by the pointing devices 410 and 420 are shown with respect to the x-axis under the first and second pointing devices 410 and 420. In addition, the patterns of the magnitudes of the currents induced by the magnetic fields generated by the pointing devices 410 and 420 are shown with respect to the y-axis at the left side of the first and second pointing devices 410 and 420.

Accordingly, the pattern of the magnitude of the current depends on how the first and second pointing devices 410 and 420 are constructed. The pattern of the magnetic field can be known through the pattern of the magnitude of the current.

A plurality of pointing devices can be distinguished from one another by constructing the pointing devices 410 and 420 so that patterns of the magnetic fields are different from one another according to the pointing devices.

In addition, the plurality of pointing devices may be distinguished from one another on the basis of the period of a change in the pattern of the magnetic field.

Figure 5:
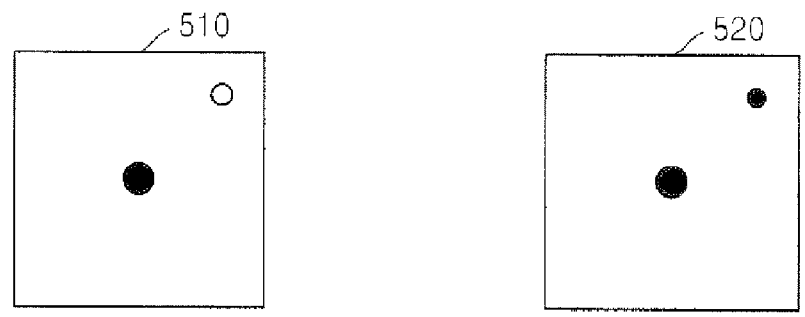
FIG. 5 illustrates a method of distinguishing a plurality of pointing devices from one anther.

FIG. 5 illustrates a method of distinguishing a plurality of pointing devices from one anther.

Pointing devices 510 and 520, shown in FIG. 5, are constructed by combining a permanent magnet with an electromagnet. In the pointing device 510 on the left, the electromagnet does not generate a magnetic field. In the pointing device 520 on the right, the electromagnet generates a magnetic field. It can be known from shapes of the magnitudes of the currents shown under the pointing devices that patterns of the magnetic fields in the above cases are different. In the exemplary embodiment, the generation of the magnetic field of the electromagnet is periodically controlled, and the plurality of pointing devices are distinguished from one another on the basis of the period of a change in the pattern of the magnetic field.

For example, when the pointing device 510 controls the generation of the magnetic field of the electromagnet once for five seconds and when the pointing device 520 controls the generation of the magnetic field of the electromagnet once for one second, the pointing devices 510 and 520 are sensed as different pointing devices. Accordingly, pointing operations of the different pointing devices can be distinguished from one another.

Up to now, there is illustrated a method of distinguishing pointing devices from one another. Hereinafter, there will be described a method of sensing a location and a rotation operation of the pointing device.

Figure 6:
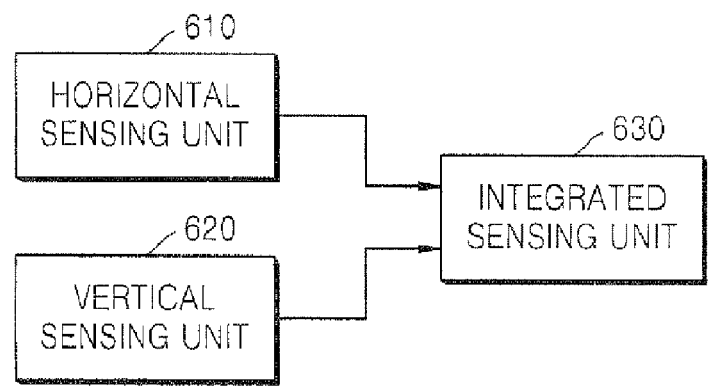
FIG. 6 illustrates a pointing sensing unit according to an exemplary embodiment of the present invention.

FIG. 6 illustrates a pointing sensing unit according to an exemplary embodiment of the present invention.

Referring to FIG. 6, the pointing sensing unit according to the exemplary embodiment includes a horizontal sensing unit 610, a vertical sensing unit 620, and an integrated sensing unit 630.

The horizontal sensing unit 610 senses a magnetic field generated by the pointing device in the x-axis direction.

The vertical sensing unit 620 senses the magnetic field generated by the pointing device in the y-axis direction.

The integrated sensing unit 630 senses a location and a direction of rotation of the pointing device by using the magnetic field sensed by the horizontal and vertical sensing units 610 and 620.

Figure 7:
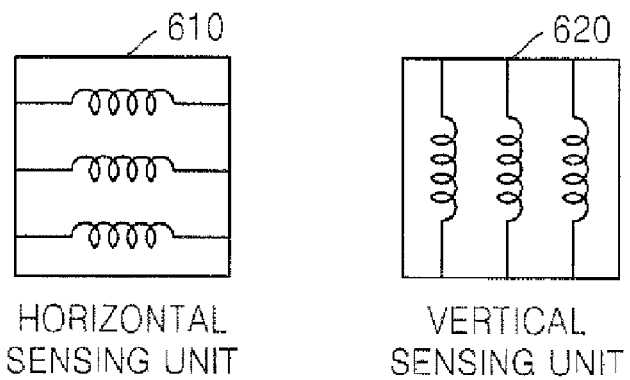
FIG. 7 illustrates horizontal and vertical sensing units according to an exemplary embodiment of the present invention.

FIG. 7 illustrates horizontal and vertical sensing units according to an exemplary embodiment of the present invention.

Referring to FIG. 7, the horizontal and vertical sensing units 610 and 620 are constructed with a coil in which a current is induced when a pointing device approaches the coil within a predetermined distance.

The integrated sensing unit 630 senses a location at which the magnitude of the current induced in the horizontal and vertical sensing units 610 and 620 is the largest as the location of the pointing device.

For example, when the horizontal sensing unit 610 senses that the magnitude of the current induced at a coordinate x1 is the largest, and when the vertical sensing unit 620 senses that the magnitude of the current induced at a coordinate y1 is the largest, the location of the pointing device is a coordinate ($x_1$, $y_1$).

Figure 8:
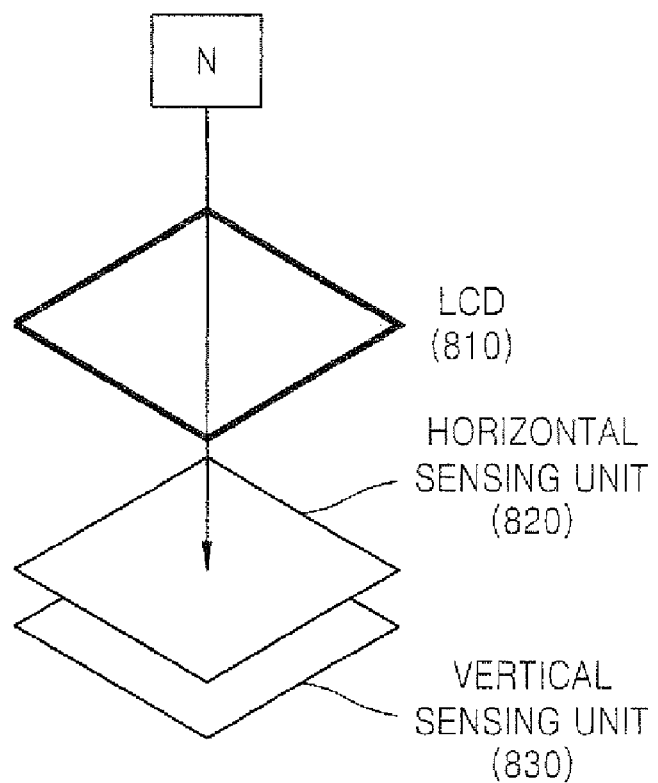
FIG. 8 illustrates installation of horizontal and vertical sensing units according to an exemplary embodiment of the present invention.

FIG. 8 illustrates installation of horizontal and vertical sensing units according to an exemplary embodiment of the present invention.

In FIG. 8, a method of installing horizontal and vertical sensing units in an LCD display device is illustrated. Horizontal and vertical sensing units 820 and 830 are installed under an LCD panel 810 so that the horizontal and vertical sensing units 820 and 830 overlap with each other. Since the size and the volume of the horizontal and vertical sensing units 820 and 830 are not large, it is possible to easily install the horizontal and vertical sensing units 820 and 830 without changing a structure of an existing LCD display device.

Figure 9:
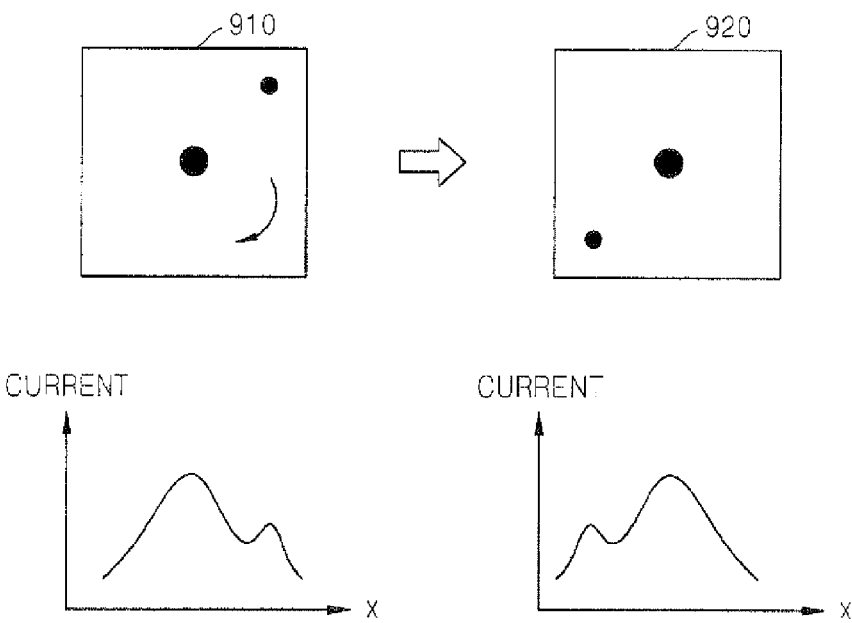
FIG. 9 illustrates a method of sensing a direction of rotation by a pointing sensing unit according to an exemplary embodiment of the present invention.

FIG. 9 illustrates a method of sensing a rotation direction by a pointing sensing unit according to an exemplary embodiment of the present invention.

FIG. 9 illustrates a case where a pointing device rotates in a clockwise direction.

A pattern of a magnetic field of the pointing device 510 before rotation of the pointing device 510 and a pattern of a magnetic field of the pointing device 520 after rotation of the pointing device 510 are shown under the pointing devices 510 and 520. As shown in FIG. 9, although the pointing devices are the same, the pointing devices have different patterns of the magnetic fields because of rotation of the pointing devices. The pointing sensing unit 120 senses whether the pointing device rotates and the direction of rotation based on the changed pattern of the magnetic field.

Figure 10:
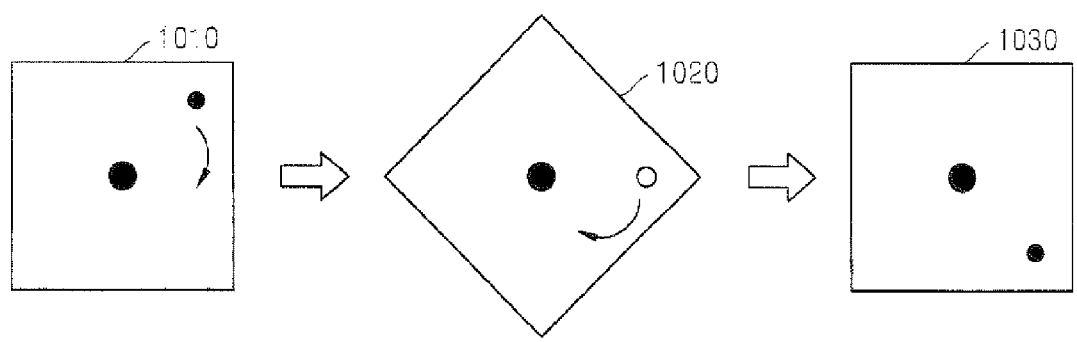
FIG. 10 illustrates a method of sensing a rotation direction by a pointing sensing unit according to another exemplary embodiment of the present invention.

FIG. 10 illustrates a method of sensing a rotation direction by a pointing sensing unit according to another exemplary embodiment of the present invention.

Referring to FIG. 10, there is illustrated a procedure in which a pointing device constructed by combining a permanent magnet and an electromagnet rotates. In operation 1010, the electromagnet generates a magnetic field, but in operation 1020, the electromagnet does not generate a magnetic field. In operation 1030, the electromagnet generates a magnetic field, again.

The pointing sensing unit 120 can sense the direction of rotation based on the pattern of the magnetic field which is periodically changed due to the generation of the magnetic field caused by the electromagnet.

For example, in FIG. 10, since the magnetic field generated by the electromagnet in the right side of the central permanent magnet turns on and off, the pointing sensing unit 120 senses that the pointing device rotates in a clockwise direction.

On the other hand, the pointing sensing unit 120 according to the exemplary embodiment may be constructed with a plurality of unit cells which sense the magnetic field generated by the pointing device 110.

Figure 11:
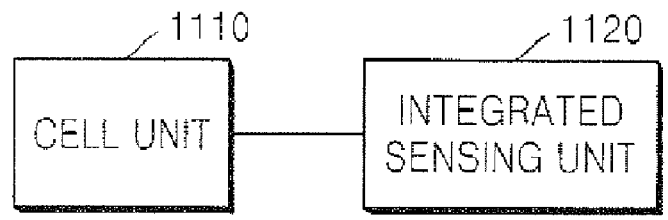
FIG. 11 illustrates a pointing sensing unit according to another exemplary embodiment of the present invention.

FIG. 11 illustrates a pointing sensing unit according to another exemplary embodiment of the present invention.

Referring to FIG. 11, the pointing sensing unit according to the exemplary embodiment includes a cell unit 1110 and an integrated sensing unit 1120.

The cell unit 1110 includes a plurality of unit cells which senses the magnetic field generated by the pointing device 110.

Each unit cell may be constructed with a coil in which a current is induced when the pointing device approaches the coil within a predetermined distance.

The integrated sensing unit 1120 senses a location of a unit cell in which the largest current is induced among the plurality of unit cells of the cell unit 1110 and senses that the location of this cell unit is the location of the pointing device 110.

Figure 12:
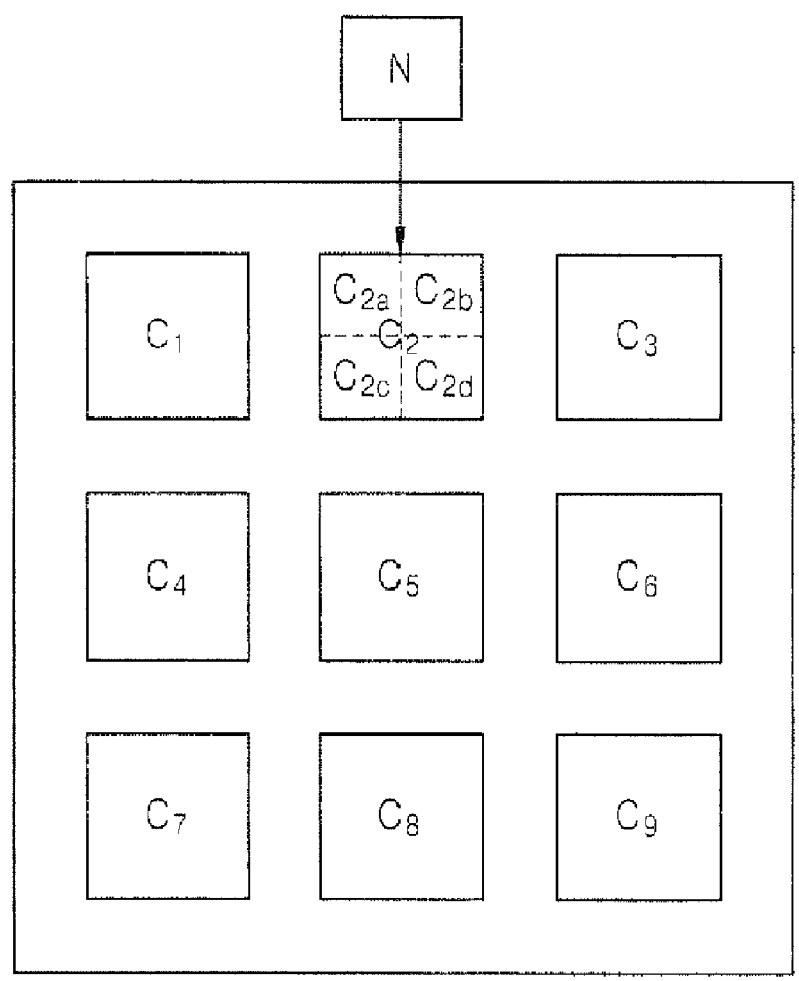
FIG. 12 illustrates a cell unit according to an exemplary embodiment of the present invention.

FIG. 12 illustrates a cell unit according to an exemplary embodiment of the present invention.

In FIG. 12, a cell unit constructed with nine unit cells is illustrated.

In FIG. 12, when a pointing device N approaches a unit cell $C_2$, currents are induced in unit cells $C_1$ and $C_3$ in addition to the unit cell $C_2$. This is because a magnetic field also influences the unit cells $C_1$ and $C_3$.

The integrated sensing unit 1120 senses a location of a unit cell in which the largest current is induced among the unit cells $C_1$ to $C_3$ as the location of the pointing device N. In the case shown in FIG. 12, the largest current is induced in the unit cell $C_2$. Accordingly, the pointing device N is sensed to be located in the unit cell $C_2$.

In addition, the unit cell may be constructed with a button which is pressed by a repulsive force with respect to the magnetic field generated in the pointing device.

For example, when the pointing device has an N-pole, and when the unit cell is constructed with a button having an N-pole, the unit cell adjacent to the pointing device is pressed.

In case of FIG. 12, when the pointing device having the N-pole approaches the unit cell $C_2$ that is a button having an N-pole, the unit cell $C_2$ is pressed. As described above, when each unit cell is constructed with a button having a magnetic field, only the unit cell pressed by the pointing device N is influenced by the pointing device N, and the other unit cells are not influenced by the pointing device N.

In this case, the integrated sensing unit 1120 senses a location of the pressed unit cell as the location of the pointing device N. Accordingly, in FIG. 12, the pointing device N is sensed to be located in the unit cell $C_2$.

In addition, the unit cell may be constructed with a pressure sensor which senses pressing strength due to the repulsive force with respect to the magnetic field generated by the pointing device in each region of the unit cell.

In this case, the size of the unit cell is large. Even when the single unit cell is pressed, the location of the region of the unit cell is sensed by determining which region is pressed among the regions of the pressed unit cell.

For example, when it is sensed that the unit cell $C_2$ is pressed in FIG. 12, a more detailed location is sensed by determining which region of the unit cell $C_2$ is pressed.

In this case, the integrated sensing unit senses a location of a region in which the pressing strength is the largest among the regions of the unit cell as the location of the pointing device N.

For example, in FIG. 12, when it is sensed that the unit cell $C_2$ is pressed, the integrated sensing unit senses a location of a sub-cell in which pressing strength is largest as the location of the pointing device by determining a sub-cell in which the pressing strength is largest among sub-cells $C_{2a}$, $C_{2b}$, $C_{2c}$, and $C_{2d}$. For example, when the pressing strength is largest in the sub-cell $C_{2a}$, the integrated sensing unit senses the sub-cell $C_{2a}$ as the location of the pointing device.

On the other hand, the number of unit cells which constitutes the cell unit is not limited to the aforementioned nine. The cell unit may be constructed with nine or more unit cells or nine or less unit cells according to an exemplary embodiment of the present invention.

When one or more pointing devices which generate magnetic fields move or rotate, it is possible to provide a multi-pointing operation without interference of other objects having no magnetic field by sensing the location and the direction of rotation of the pointing device based on the pattern of the magnetic field generated by the pointing device and the change in the pattern.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A multi-pointing system using a magnetic field comprising:
    at least one pointing device which includes at least two electromagnetic sources to generate a magnetic field, each of the electromagnetic sources selected from the group consisting of a permanent magnet and an electromagnet; and
    a pointing sensing unit which senses a location and a direction of rotation of the pointing device based on a pattern of the magnetic field generated by the pointing device and a change in the pattern,
    wherein the pointing sensing unit comprises:
        a horizontal sensing unit which senses the magnetic field generated by the pointing device at a plurality of locations along an x-axis direction; and
        a vertical sensing unit which senses the magnetic field generated by the pointing device at a plurality of locations along a y-axis direction, and
    wherein the pattern of the magnetic field sensed by the pointing sensing unit is based on positions of the at least two electromagnetic sources within the pointing device.

2. The multi-pointing system of claim 1, wherein the plurality of locations along the x-axis direction comprises at least three locations along the x-direction, and the plurality of locations along the y-direction comprises at least three locations along the y-direction.

3. The multi-pointing system of claim 1, wherein the pointing sensing unit further comprises:
    an integrated sensing unit which senses the location and the direction of rotation of the pointing device by using the magnetic field sensed by the horizontal and vertical sensing units.

4. The multi-pointing system of claim 3, wherein the horizontal and vertical sensing units are constructed with a coil in which a current is induced when the pointing device approaches the coil, and wherein the integrated sensing unit senses the location and the direction of rotation of the pointing device by using a pattern of a magnitude of the current induced in the coil and a change in the pattern.

5. The multi-pointing system of claim 4, wherein the integrated sensing unit senses a location in which the magnitude of the current is the largest as the location of the pointing device.

6. The multi-pointing system of claim 1, wherein the pointing sensing unit further comprises:
    a cell unit which includes a plurality of unit cells that sense the magnetic field generated by the pointing device; and
    an integrated sensing unit which senses the location and the direction of rotation of the pointing device by using the magnetic field sensed by the cell unit.

7. The multi-pointing system of claim 6, wherein the plurality of unit cells are constructed with a coil in which a current is induced when the pointing device approaches the coil, and wherein the integrated sensing unit senses a location of a unit cell in which largest current is induced among the plurality of unit cells as the location of the pointing device.

8. The multi-pointing system of claim 6, wherein the plurality of unit cells are constructed with a button which is pressed by a repulsive force with respect to the magnetic field generated by the pointing device, and the integrated sensing unit senses a location of the pressed button as the location of the pointing device.

9. The multi-pointing system of claim 6, wherein the plurality of unit cells are constructed with a plurality of regions and with a pressure sensor which senses pressing strength due to the repulsive force with respect to the magnetic field generated by the pointing device in each region, and wherein the integrated sensing unit senses a location of a region in which the pressing strength is the largest among the regions of a pressed unit cell among the plurality of unit cells as the location of the pointing device.

10. The multi-pointing system of claim 1, wherein the pointing device has a pen shape or a puck shape.

11. The multi-pointing system of claim 1, wherein the at least one pointing device comprises a plurality of pointing devices, the horizontal and vertical sensing units are constructed with a plurality of coils in which a plurality of respective currents are induced when one of the plurality of pointing devices approaches the plurality of coils, and a pattern of magnitudes of the plurality of currents induced in the plurality of coils is different for each of the plurality of pointing devices.

12. The multi-pointing system of claim 1, wherein when there is a plurality of pointing devices, locations and directions of rotations of plurality of the pointing devices are separately sensed based on patterns of magnetic fields generated by the plurality of the pointing devices or periods of changes in the patterns.

13. A multi-pointing method comprising:
allowing at least one pointing device comprising at least two electromagnetic sources and which generates a magnetic field to move or rotate, each of the electromagnetic sources selected from the group consisting of a permanent magnet and an electromagnet; and
sensing a location and a direction of rotation of the at least one pointing device based on a pattern of the magnetic field generated by the at least one pointing device and a change in the pattern,
wherein the sensing of the location and the direction of rotation of the at least one pointing device comprises:
sensing the magnetic field generated by the at least one pointing device at a plurality of locations along a x-axis direction and at a plurality of locations along a y-axis direction; and
sensing the location and the direction of rotation of the at least one pointing device by using the sensed magnetic field, and wherein the pattern of the magnetic field sensed by the pointing sensing unit is based on positions of the at least two electromagnetic sources within the pointing device.

14. The multi-pointing method of claim 13, wherein in the sensing of the location and the direction of rotation of the at least one pointing device, the magnetic field is sensed by using a pattern of a magnitude of a current induced in a coil, in which the current is induced when the at least one pointing device approaches the coil, and a change in the pattern.

15. The multi-pointing method of claim 14, wherein in the sensing of the location and the direction of rotation of the at least one pointing device, a location in which the magnitude of the current is the largest is sensed as the location of the pointing device.

16. The multi-pointing method of claim 13, wherein in the sensing of the location and the direction of rotation of the at least one pointing device, a plurality of unit cells sense the magnetic field generated by the at least one pointing device and the location and the direction of rotation of the at least one pointing device are sensed by using the magnetic field sensed by the plurality of unit cells.

17. The multi-pointing method of claim 16, wherein in the sensing of the location and the direction of rotation of the at least one pointing device, a location of a unit cell in which a largest current is induced among the plurality of unit cells is sensed as the location of the pointing device.

18. A non-transitory computer-readable recording medium having embodied thereon a computer program for executing the method of claim 13.

19. The multi-pointing method of claim 13, wherein the plurality of locations along the x-axis direction comprises at least three locations along the x-direction, and the plurality of locations along the y-direction comprises at least three locations along the y-direction.

20. The multi-pointing method of claim 13, wherein in the sensing of the location and the direction of rotation of the at least one pointing device, when there are a plurality of pointing devices, locations and directions of rotations of the plurality of pointing devices are separately sensed based on patterns of magnetic fields generated by the plurality of pointing devices or periods of changes in the patterns.

21. A multi-pointing system using a magnetic field comprising:
at least one pointing device which includes at least two electromagnetic sources to generate a magnetic field, each electromagnetic source selected from the group consisting of a permanent magnet and an electromagnet; and
a pointing sensing unit which senses a location and a direction of rotation of the pointing device based on a pattern of the magnetic field generated by the pointing device and a change in the pattern and senses the magnetic field generated by the pointing device at a plurality of locations along one of an X-direction and a Y-direction,
wherein the pattern of the magnetic field sensed by the pointing sensing unit is based on positions of the at least two electromagnetic sources within the pointing device.

22. The multi-pointing system of claim 21, wherein the plurality of locations along the x-axis direction comprises at least three locations along the x-direction, and the plurality of locations along the y-direction comprises at least three locations along the y-direction.

23. The multi-pointing system of claim 21, wherein the at least one pointing device comprises a plurality of pointing devices, the horizontal and vertical sensing units are constructed with a plurality of coils in which a plurality of respective currents are induced when one of the plurality of pointing devices approaches the plurality of coils, and a pattern of magnitudes of the plurality of currents induced in the plurality of coils is different for each of the plurality of pointing devices.

24. The multi-pointing system of claim 21, wherein when there is a plurality of pointing devices, locations and directions of rotations of plurality of the pointing devices are separately sensed based on patterns of magnetic fields generated by the plurality of the pointing devices or periods of changes in the patterns.

* * * * *